Dec. 27, 1966  J. R. PREZIOSI  3,294,139
PLASTIC PATCH, SELF-LOCKING THREADED FASTENERS AND
METHODS OF MAKING SUCH FASTENERS
Filed Sept. 23, 1964  8 Sheets-Sheet 1
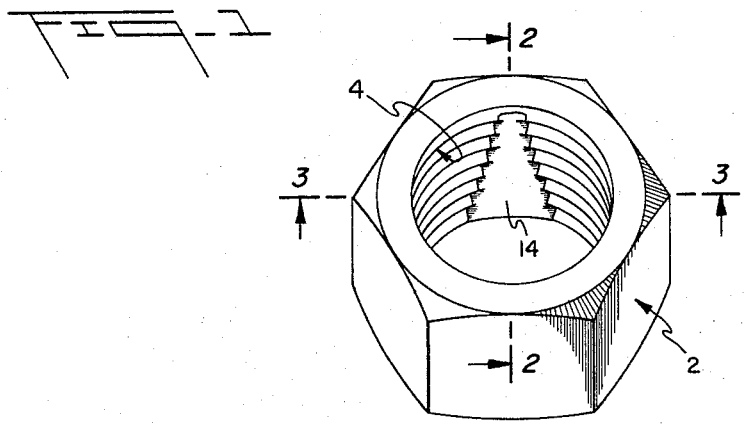
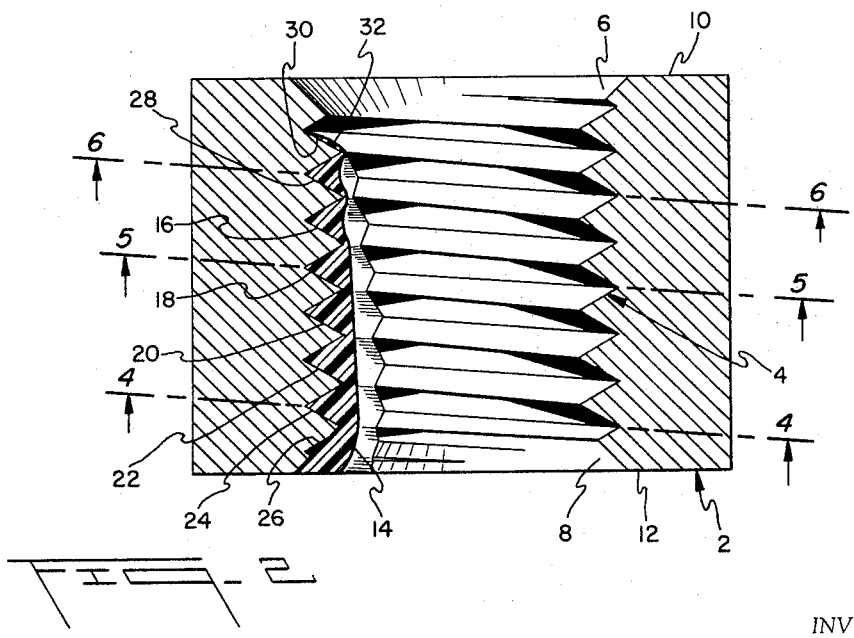
INVENTOR.
JOSEPH R. PREZIOSI
BY
PRANGLEY, BAIRD, CLAYTON, MILLER & VOGEL
ATTORNEYS

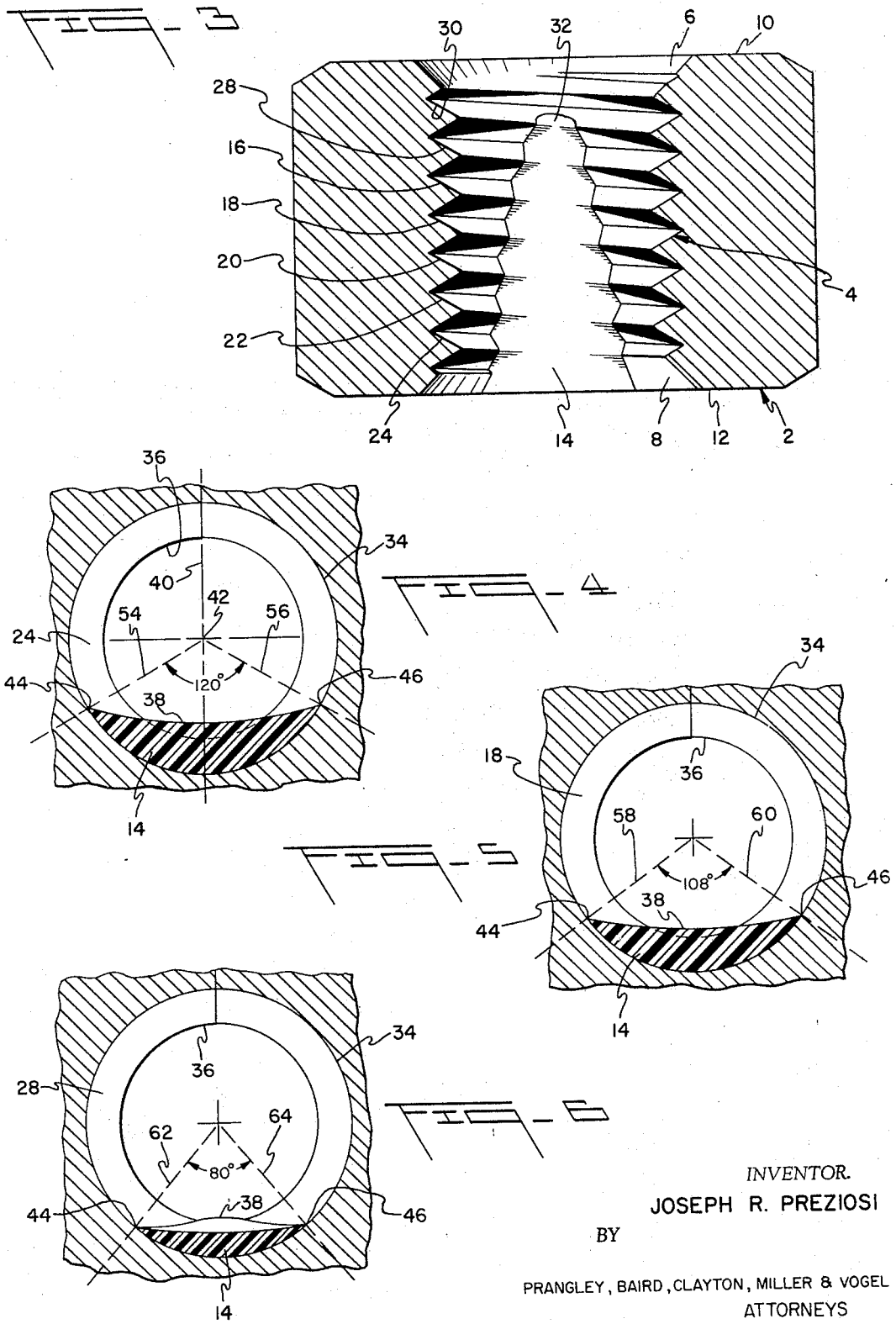

Dec. 27, 1966  J. R. PREZIOSI  3,294,139
PLASTIC PATCH, SELF-LOCKING THREADED FASTENERS AND
METHODS OF MAKING SUCH FASTENERS
Filed Sept. 23, 1964  8 Sheets-Sheet 3
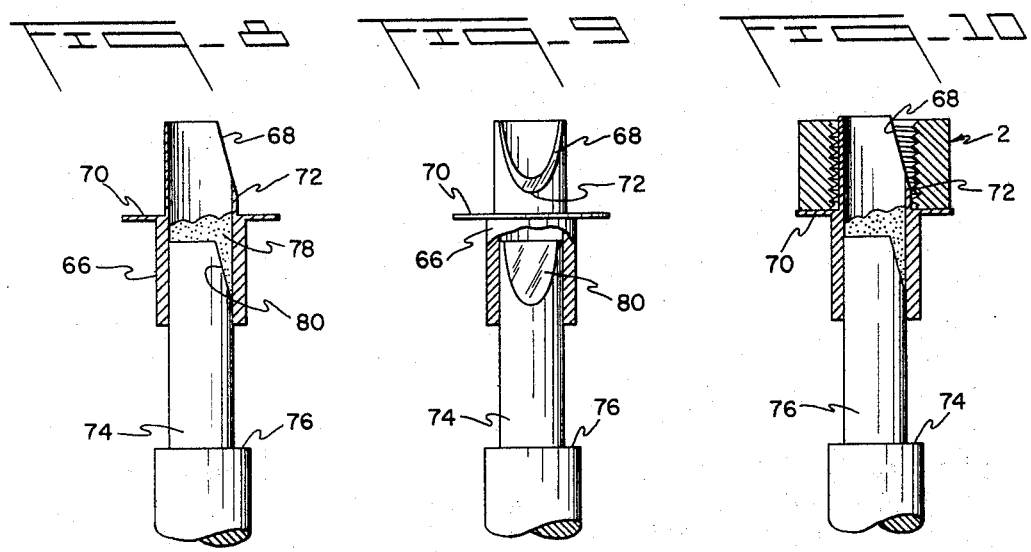
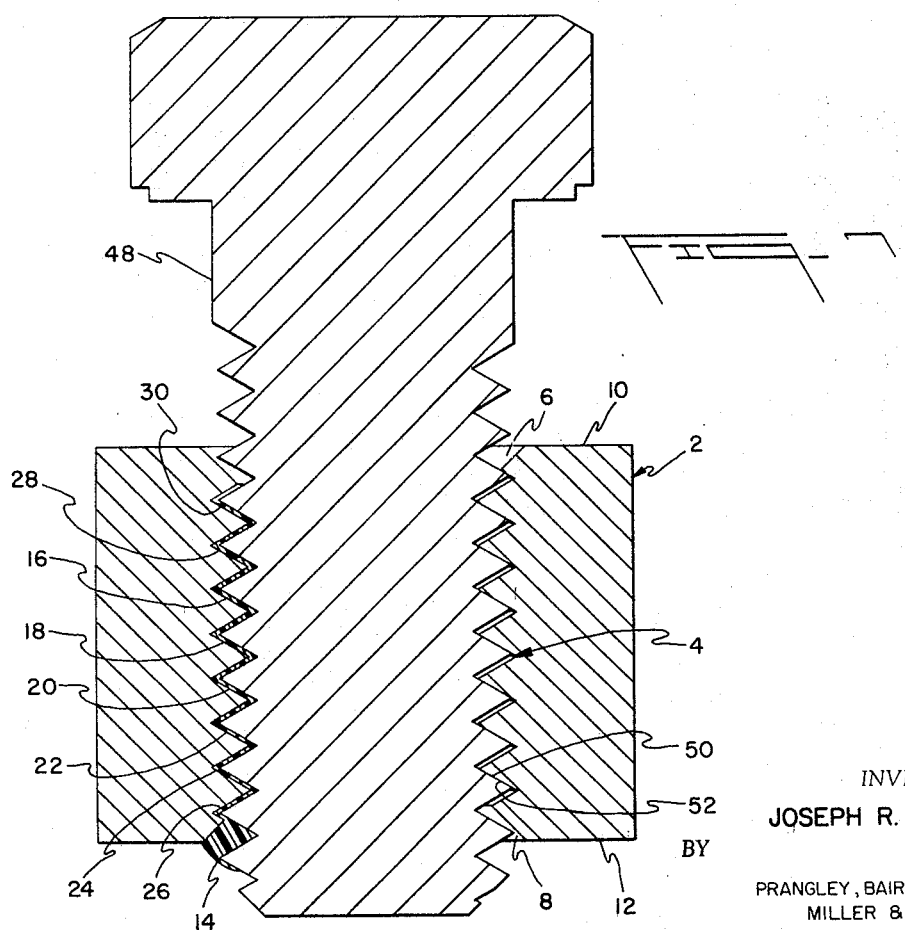
INVENTOR.
JOSEPH R. PREZIOSI
BY
PRANGLEY, BAIRD, CLAYTON,
MILLER & VOGEL
ATTORNEYS Dec. 27, 1966            J. R. PREZIOSI           3,294,139
PLASTIC PATCH, SELF-LOCKING THREADED FASTENERS AND
METHODS OF MAKING SUCH FASTENERS
Filed Sept. 23, 1964                     8 Sheets-Sheet 4
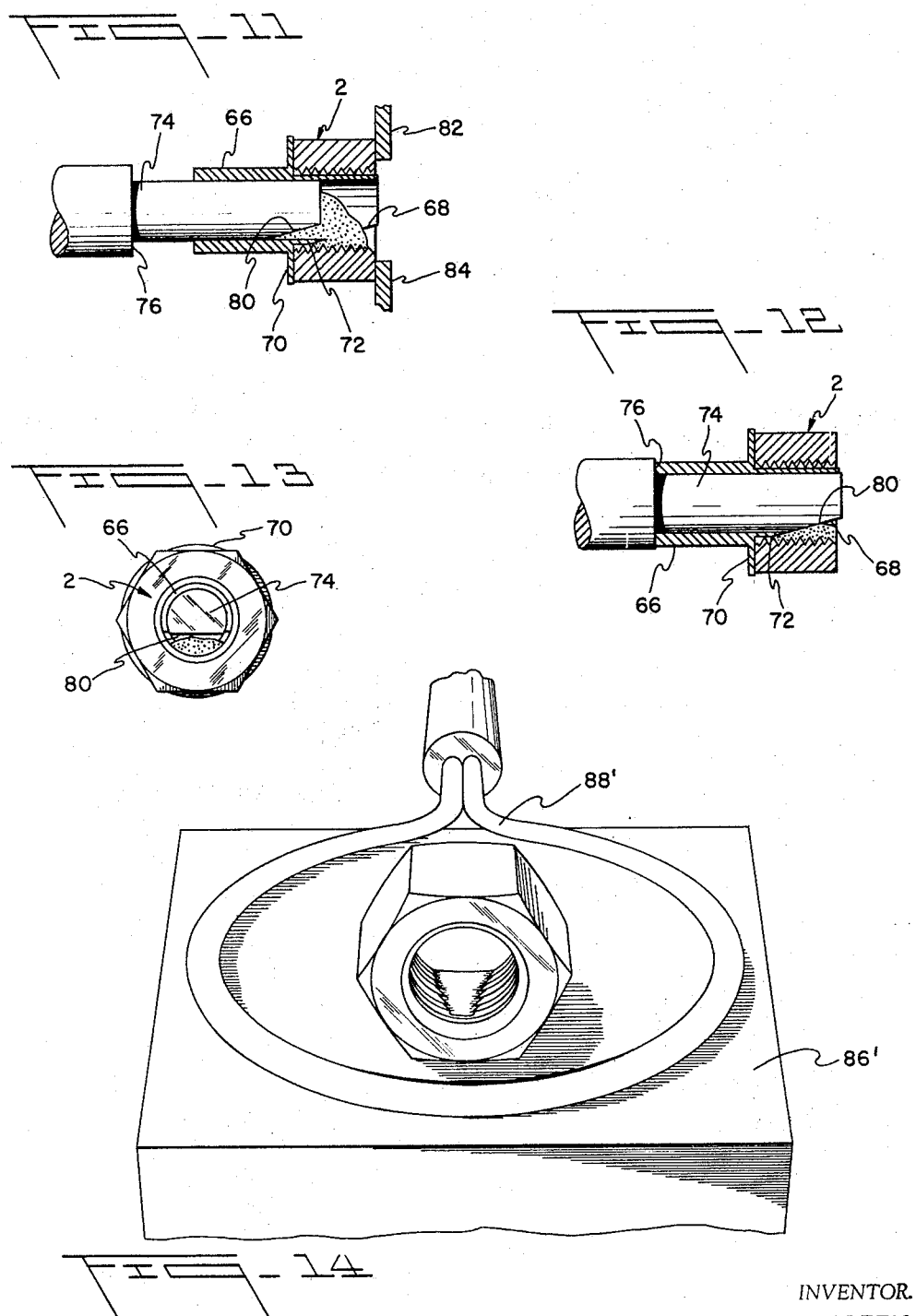
INVENTOR.
JOSEPH R. PREZIOSI
BY
PRANGLEY, BAIRD, CLAYTON, MILLER & VOGEL
ATTORNEYS Dec. 27, 1966 J. R. PREZIOSI 3,294,139
PLASTIC PATCH, SELF-LOCKING THREADED FASTENERS AND
METHODS OF MAKING SUCH FASTENERS
Filed Sept. 23, 1964 8 Sheets-Sheet 5
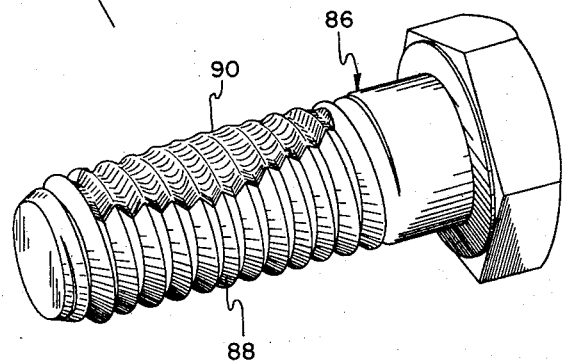
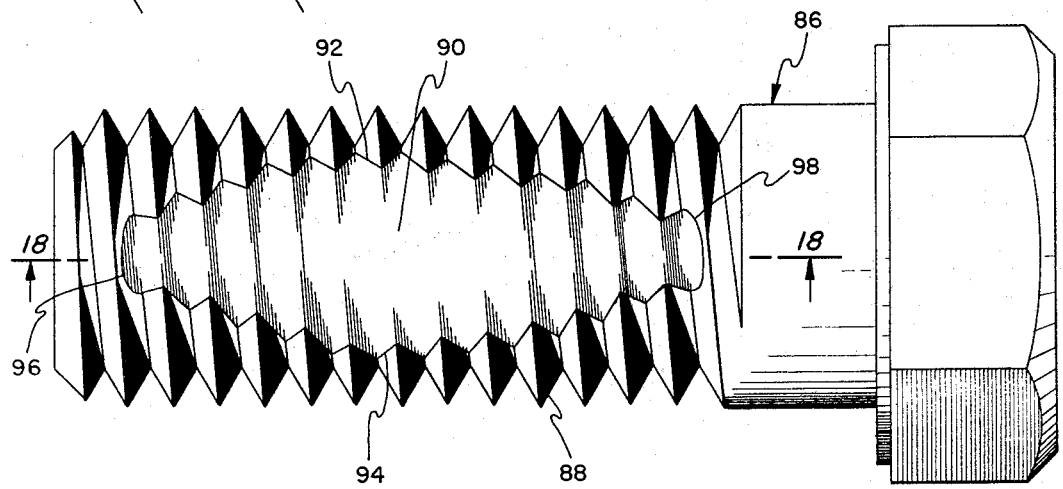
INVENTOR.
JOSEPH R. PREZIOSI
BY
PRANGLEY, BAIRD, CLAYTON, MILLER & VOGEL
ATTORNEYS Dec. 27, 1966  J. R. PREZIOSI  3,294,139
PLASTIC PATCH, SELF-LOCKING THREADED FASTENERS AND
METHODS OF MAKING SUCH FASTENERS
Filed Sept. 23, 1964  8 Sheets-Sheet 6
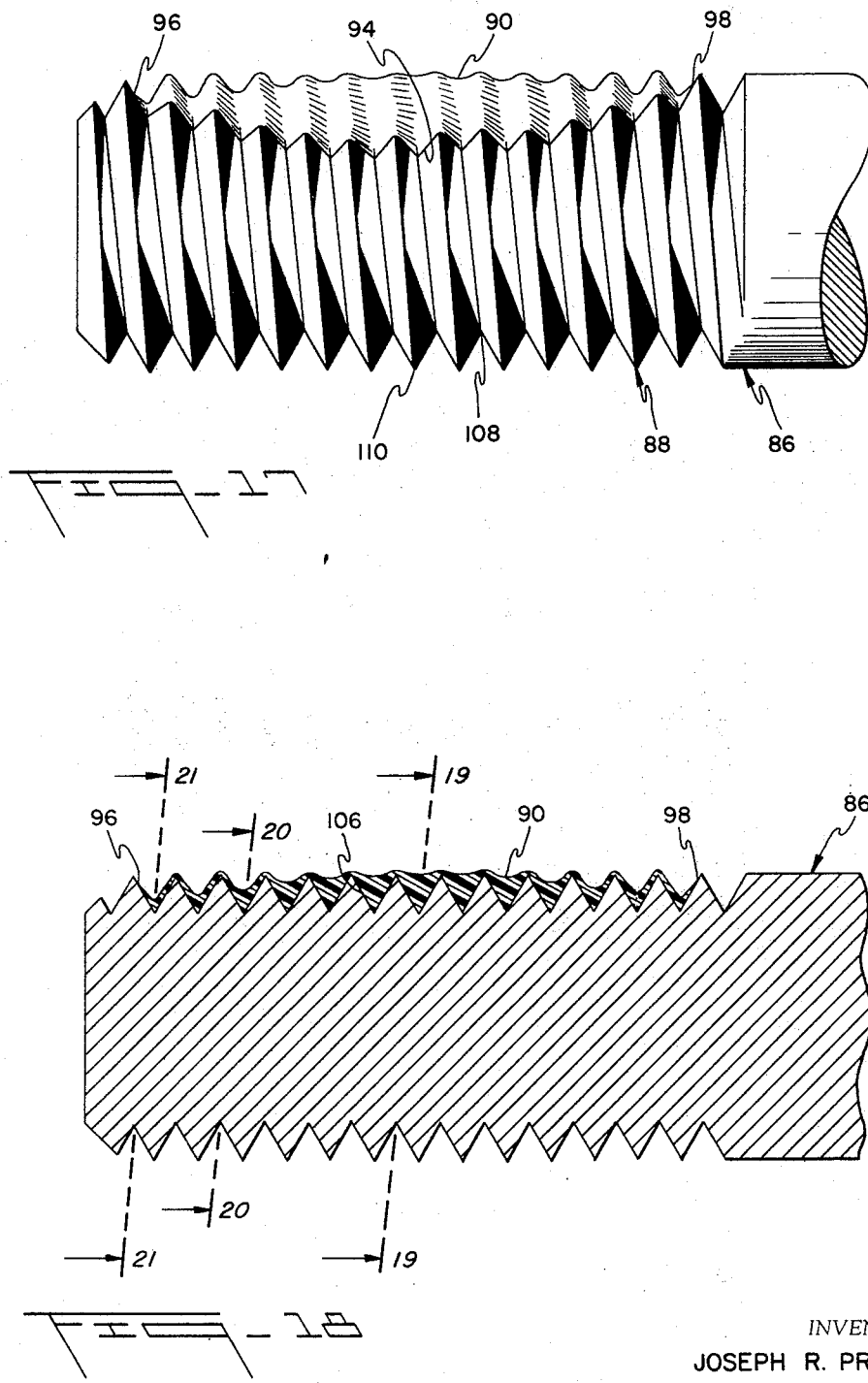
INVENTOR.
JOSEPH R. PREZIOSI
BY
PRANGLEY, BAIRD, CLAYTON, MILLER & VOGEL
ATTORNEYS Dec. 27, 1966   J. R. PREZIOSI   3,294,139
PLASTIC PATCH, SELF-LOCKING THREADED FASTENERS AND
METHODS OF MAKING SUCH FASTENERS
Filed Sept. 23, 1964   8 Sheets-Sheet 7
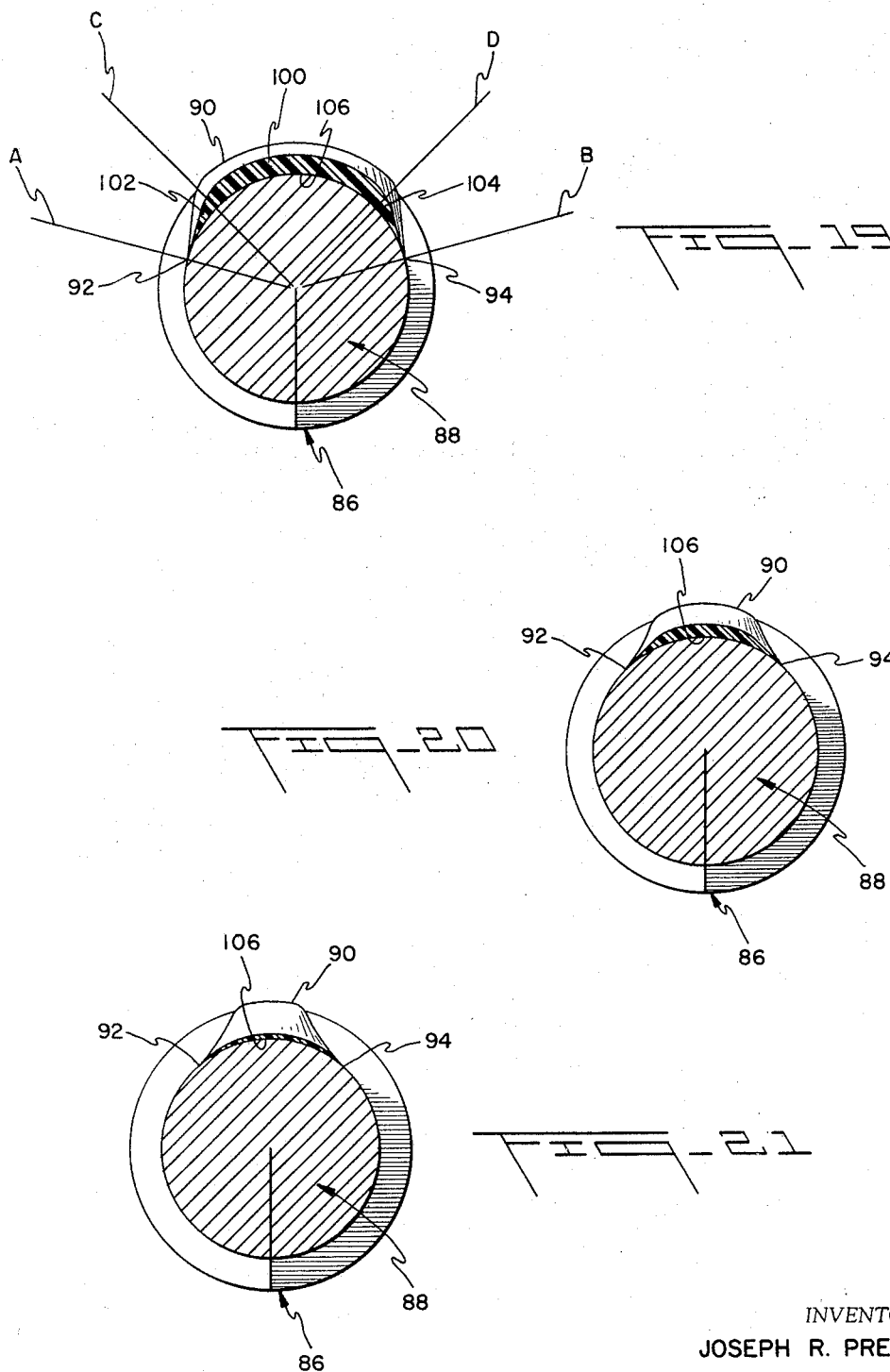
INVENTOR.
JOSEPH R. PREZIOSI
BY
PRANGLEY, BAIRD, CLAYTON, MILLER & VOGEL
ATTORNEYS Dec. 27, 1966   J. R. PREZIOSI   3,294,139
PLASTIC PATCH, SELF-LOCKING THREADED FASTENERS AND
METHODS OF MAKING SUCH FASTENERS
Filed Sept. 23, 1964   8 Sheets-Sheet 8
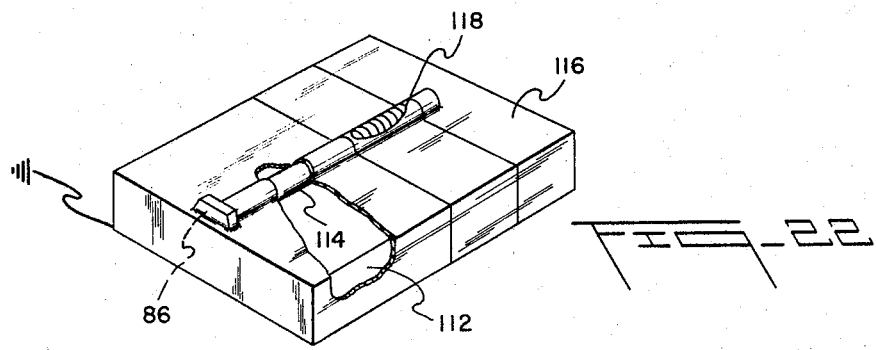
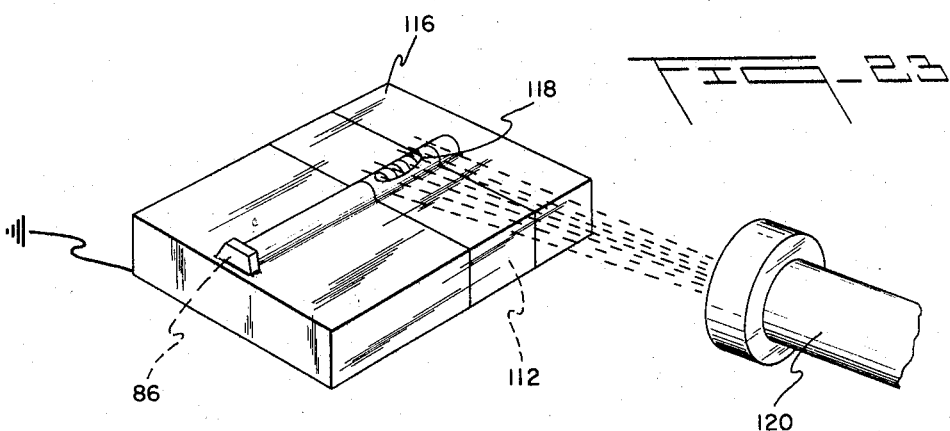
INVENTOR.
JOSEPH R. PREZIOSI
BY
PRANGLEY, BAIRD, CLAYTON, MILLER & VOGEL
ATTORNEYS

United States Patent Office 3,294,139
Patented Dec. 27, 1966

3,294,139
PLASTIC PATCH, SELF-LOCKING THREADED FASTENERS AND METHODS OF MAKING SUCH FASTENERS
Joseph R. Preziosi, Clark, N.J., assignor to Elastic Stop Nut Corporation of America, Union, N.J., a corporation of New Jersey
Filed Sept. 23, 1964, Ser. No. 398,495
15 Claims. (Cl. 151—7)

This application is a continuation-in-part of application Serial No. 371,604, filed June 1, 1964, now abandoned.

The present invention relates to re-usable self-locking threaded fasteners and methods of making the same, and, more specifically, to threaded fasteners in which the self-locking action is obtained by a resiliently deformable plastic patch bonded to the thread surface.

Re-usable self-locking nuts and screws having plastic inserts have found wide acceptance where the necessities of their use justify their relatively high cost of manufacture. Much effort has been expended over a period of many years to reduce the cost of manufacture, and thereby increase their range of usefulness, but without notable success. Furthermore, such nuts and screws involve the formation of a groove or other recess to receive the insert, thus tending to reduce the strength or to require an increase in the fastener dimensions.

It has been previously suggested that the manufacturing operations can be simplified and the cost of manufacture reduced, by securing a preformed pellet of plastic material to an externally threaded fastener or screw of standard thread form by the simultaneous application of heat and pressure. Neither this process nor the resulting product has been found to be entirely satisfactory for its intended purpose. The process requires the use of a pair of relatively high cost, preformed die members for applying the requisite deforming pressures to the plastic pellet while a pre-heated fastener on which the pellet is placed melts the engaged surface of the plastic pellet. Little, if any, saving in cost of manufacture has been found to result. It has been found, also, that the adherence of the die-deformed plastic pellet to the metal surface of the fastener is frequently, because of the "elastic memory" of the deformed pellet, insufficient to withstand the normal shearing and stripping forces applied thereto by the thread of a complementary internally threaded fastener element or nut as it is threaded on the screw. This stripping, or peeling, of the plastic pellet from the nut thread precludes reuse of the externally threaded element or screw. It has been found that if the die deformed pellet is initially properly dimensioned to create a desired locking torque below a maximum allowable on initial application the locking torque on subsequent application is frequently of a value below the minimum desired in a reusable self-locking screw. Undesirable stresses of significant magnitude are created at the metal-plastic interface and these stresses, in effect, reduce the adherence capabilities. The adherence of the preformed plastic pellet to the fastener is therefore unreliable and unpredictable.

Various proposals have been advanced for the die-form molding of plastic materials in the thread root area of nuts and screws of special thread forms but such processes have been found unsatisfactory as being unadaptable to mass production methods of manufacture and the resulting products have been found unsatisfactory by reason of the insufficiency of the bond between the metal and the plastic to withstand the normal stripping and shearing forces of the thread of the complementarily threaded element. Other mechanical and chemical defects and insufficiencies have also precluded qualification of the products as reusable self-locking fasteners.

It is accordingly an object of this invention to provide a self-locking threaded fastener in which the self-locking action is obtained by a resiliently deformable plastic patch so securely bonded to the thread surface as to permit at least five or more re-uses of the fastener while still providing a locking torque above the minimum required for qualification of the fastener as a reusable self-locking fastener and to devise such methods of manufacturing the same as will eliminate the need for high cost molding equipment.

Other and further objects of the invention are to provide a plastic patch self-locking fastener of such structure and so formed as to make possible the utilization of the elastic memory of the plastic material to maintain an adequate locking torque over a number of re-uses while eliminating costly manufacturing operations required to provide mechanical means adequate to retain plastic inserts in operative association with the thread of a fastener; to provide a threaded fastener with a self-locking plastic patch of such form and configuration, and so bonded to the thread surfaces as to minimize or wholly eliminate the stripping of the plastic material from the fastener element; to provide a metal fastener of standard thread form with a plastic coating adequate in size and form and in adherence to the metal surface of the thread to create the necessary self-locking torque when used with a complementary threaded element of standard thread form and within standard dimensional limits; to provide a threaded fastener with a plastic self-locking patch or coating having the leading boundaries thereof gradually merging into the thread defining surfaces of the fastener to minimize the stripping component of the forces exerted on the patch or coating by the thread defining surfaces of the mating element; to provide a threaded fastener with a free-form plastic patch, i.e., a patch of plastic material formed without application of work shaping or molding pressures, securely bonded to the root, flank and crest surfaces throughout a limited angular extent and for a predetermined number of thread convolutions; to create a locking torque within a desired maximum-minimum range of values both on initial application and on re-use; to provide a threaded fastener with a self-locking plastic patch of predetermined angular extent and of selected materials allowing adequate resilient elongation and deformation of the material to accommodate a mating element having thread form dimensions within standard specifications; to provide a threaded fastener with a self-locking plastic patch of fused powder strongly adherent to the metal surface of the fastener and of such predetermined, limited angular extent that non-coated areas adjacent to the patch are adequate to accommodate any excess plastic that may be displaced or deformed by the complementary threaded element; to provide a threaded fastener with a self-locking plastic patch of fused powder strongly adherent to the metal surface of the fastener and of such predetermined, limited angular extent that non-coated areas adjacent that may be displaced or deformed by the complementary threaded element; to provide a threaded fastener with a self-locking plastic patch of fused powder substantially free from adherent reducing internal stresses; to provide a threaded fastener with a fused powder plastic patch mechanically interlocked with the surface of the fastener to better withstand the stripping forces of the complementary thread; and to provide a threaded fastener with a self-locking plastic patch formed by the free gravity flow of melted plastic over the thread defining surfaces of a predetermined number of thread convolutions as determined by a controlled deposit of powder on a selected area of the fastener thread.

Other and further objects and advantages of the invention will be apparent from the following description when taken in connection with the accompanying drawings, wherein:

FIGURE 1 is a view in perspective of a plastic patch self-locking nut embodying the present invention;

FIGURE 2 is a view in longitudinal section taken along the line 2—2 of FIGURE 1;

FIGURE 3 is a view in longitudinal section taken along the line 3—3 of FIGURE 1;

FIGURES 4, 5 and 6 are each fragmentary views in cross section taken along the lines 4—4, 5—5 and 6—6, respectively, of FIGURE 2;

FIGURE 7 is a view in longitudinal section illustrating the thread wedging, locking action resulting from the deformation of a plastic patch by a standard screw or bolt threaded into the self-locking nut of FIGURE 1;

FIGURES 8 to 14 are fragmentary views partly in section and partly in elevation and plan schematically illustrating a method and apparatus for depositing and heating plastic powder to make the self-locking nut of FIGURE 1;

FIGURE 15 is a view in perspective of a plastic patch self-locking screw or bolt embodying the present invention;

FIGURE 16 is an enlarged plan view of the bolt of FIGURE 15;

FIGURE 17 is an enlarged fragmentary view in elevation of the bolt of FIGURE 15;

FIGURE 18 is a fragmentary enlarged view in longitudinal section taken along the line 18—18 of FIGURE 16;

FIGURE 19 is a view in cross section taken along the line 19—19 of FIGURE 18;

FIGURE 20 is a view in cross section taken along the line of 20—20 of FIGURE 18;

FIGURE 21 is a view in cross section taken along the line 21—21 of FIGURE 18;

FIGURES 22 and 23 are fragmentary views illustrative of a method and certain of the apparatus for making the self-locking bolt of FIGURE 15.

Referring now to the drawings, and particularly, FIGURES 1 through 6, a reusable self-locking nut constructed in accordance with the present invention may comprise a standard nut body 2 having an internal thread 4 of standard thread form and dimensions extending longitudinally of the nut body between the end chamfers 6 and 8 extending inwardly from the work clamping face 10 and the opposite or remote face 12, respectively. The nut 2 is provided with a resiliently deformable plastic patch 14 of limited angular extent and extending from the remote face 12 longitudinally of the thread to a point at least one full thread convolution from the nut chamfer 6. The patch 14 is formed, in situ, by the heating of a preformed mound of plastic powder to a predetermined temperature sufficient to melt the powder to a relatively free flowing state. By the use of a sufficiently fine powder, an intimate contact between the plastic and the desired thread defining surfaces is achieved. The flow of the melted plastic therefore immediately "wets" the desired thread defining surfaces of the fastener with which the powder is in contact and thereby establishes a most initimate surface to surface contact between the plastic and the metal and forms, upon subsequent cooling, a predetermined, desired form and configuration of plastic patch, as illustrated in FIGURES 2 to 6.

The fused plastic powder forming the patch 14, completely fills, to a limited angular extent, the thread groove of a predetermined plurality of thread convolutions, such as indicated by the numerals 16, 18, 20, 22 and 24 in FIGURES 2 to 5. It also fills, to a limited angular extent the run-out thread convolution 26 and extends into the chamfer 8 adjacent to the remote face 12. It also substantially fills to a limited angular extent the thread convolution 28 and extends slightly over the crest of the thread into the next adjacent convolution 30.

As best illustrated in FIGURE 2 the radial depth, or thickness, of the plastic patch gradually increases longitudinally of the nut thread from the lead end 32 of the patch toward the remote face 12 of the nut.

As best illustrated in FIGURES 3 to 6 the plastic patch 14 also gradually increases in angular extent from the initial work engaging or lead end 32 of the patch toward the remote face 12 of the nut. By reason of the relatively free flow of the plastic material when in melted condition, the plastic material extends to a greater angular extent over the root surfaces of the thread, as defined by the root cylinder or circle 34 (FIGURES 4, 5 and 6), than over the adjacent crest surfaces of the thread, as defined by the crest cylinder or circle 36. Since the root and crest surfaces are cylindrical in form and concentric and since the inner or free surface 38 of the patch is defined by a substantially flat chordal line the patch is of constantly decreasing depth outwardly from a radial plane 40 which includes the thread axis 42 and the longitudinal axis of symmetry of the patch (FIGURE 4).

The relatively free flow of the plastic material under the action of gravity, when it is in melted condition, causes the free surfaces of the patch to merge gradually into the thread defining surfaces of the thread and all boundary edge portions of the patch to be tapered, thereby providing leading and trailing boundary edge portions 44 and 46 of gradually increasing thickness in the direction of advance of the mating threaded element. See FIGURES 4 to 6. The leading circumferentially, or arcuately, tapered boundary edges of the portions 44 of the plastic patch which first encounter an advancing bolt thread, cause a relatively gradual elongation of the body of the plastic patch, and the gradual longitudinal increase in the thickness and angular extent of the plastic patch assists also in the gradual buildup of deforming pressures, and the forces, or components thereof, applied initially to the boundaries of the plastic patch in a direction tending to cause stripping or peeling of the plastic material from the thread surfaces are substantially reduced or eliminated. Thus, the maximum forces are applied to a location remote from the edge of the patch and are ineffectual to effect a peeling of the patch.

As illustrated in FIGURE 7, insertion of a screw or bolt such as 48 into the nut 2 causes a circumferential elongation of the plastic patch along the crest, flank and root surfaces of the nut thread and, to a slight extent, a longitudinal elongation of the patch beyond the remote or free face 12 of the nut.

Since the outward radial components of the deforming forces exerted by the thread of the screw, as it is advanced into the nut, vary with variations in the thickness of the plastic patch, these forces will therefore attain their greatest magnitude along the diametral plane 40 of FIGURE 4 adjacent to the remote face 12 of the nut. These forces gradually increase as the screw is advanced into the nut and cause the portion of the nut thread opposite to the plastic patch to be wedged into a tight interference fit with the bolt thread, the following flank of the nut thread, as indicated by the numeral 50, FIGURE 7, wedging against the following flank of the bolt thread, as indicated by the numeral 52.

The inherent tendency of a properly selected resiliently deformable plastic material to return to its original form permits substantial reuses of the fastener.

The angular extent of the undeformed plastic patch should be sufficiently less than 180 degrees to permit it to be fully elongated circumferentially of the mated threads without extending circumferentially of the threads substantially more than 180 degrees in order to prevent the building up of counteracting wedging pressures or forces.

In a preferred example, the angular extent of the undeformed patch was held to a maximum of 120 degrees, as illustrated in FIGURE 4, this being the limiting angle between the radial lines numbered 54 and 56. In this preferred example, the sides of the patch were longitudinally tapered so that the angular extent changes at a rate on the order of 4 to 14 degrees per thread convolution, as illustrated in FIGURES 4, 5 and 6.

In the preferred example, a polyamide resin powder, specifically Nylon 11, was used as the patch material and provided initial and reuse torques well within the values necessary to qualify the product as a reusable self-locking nut.

Other resiliently deformable plastic materials possessing also certain other essential characteristics and properties, as hereinafter described, may be used in place of the polyamide resin powder and the angular extent of the plastic patch and its longitudinal length and taper may be varied as required to obtain initial and reuse torques meeting the qualifying standards or specifications for reusable self-locking nuts.

In making a lock nut embodying the present invention, it is preferred to first dip the nut in a weak acid solution to remove dirt, grease, and other foreign matter and to provide clean and, where necessary, roughened, thread surfaces so as to assure maximum wetting of the thread surface by the plastic material when in melted condition thereby to assure firm adherence of the plastic to the body of the thread.

Since most resiliently deformable materials in powder form absorb moisture, it is desirable for the obtaining of a maximum strength of bond between the plastic body and the thread body to preheat the nut to drive off moisture from the thread surfaces.

A metered quantity of the fine plastic powder is then deposited on a nut thread in such amount and so distributed when melted that it will, under the action of gravity, and as determined by the surface tension, take the form and configuration disclosed in FIGURES 1 to 6.

As illustrated in FIGURES 8 to 13, a suitable apparatus for depositing a fine plastic powder in the desired quantity and distribution may comprise a sheet metal sleeve 66 having a generally V-shaped notch 68 at one end thereof and a nut supporting external annular flange 70 intermediate the ends of the sleeve. The flange 70 is spaced from the inner edge or apex 72 of the notch 68 a predetermined distance such that the wall of the sleeve below the notch will cover the desired number of thread convolutions of the nut when the nut is placed on the flange 70 as illustrated in FIGURE 10. The outer diameter of the sleeve 66 above the flange 70 closely approximates the minor diameter of the nut thread so that the portion of the sleeve effectively masks all portions of the nut thread except that which is in communication with the interior of the sleeve through the notch 68.

The apparatus of FIGURES 8 to 13 also includes a plunger 74 slidably mounted in the sleeve 66 and formed with an annular stop shoulder 76 spaced from the forward end of the plunger a distance slightly greater than the length of the sleeve 66. The forward end of the plunger 74 is cut away on one side of its axis to provide a transversely flat and longitudinally tapered surface 80 which forms with the wall of the sleeve a metering notch for accurately controlling the amount of the powder which is deposited on the nut thread.

The plastic powder 78 to be deposited in the nut is fed into the sleeve 66 from a hopper or other supply container (not shown) when the plunger is in a retracted position as illustrated in FIGURE 8. The nut 2 is then inserted over the sleeve and into abutting engagement with the flange 70 as illustrated in FIGURE 10.

For simplicity of illustration, the plunger and sleeve are shown in vertical positions in FIGURES 8 and 10 but it should be noted that they may be initially positioned in a horizontal plane and the plastic powder injected into the sleeve by a suitable nozzle and while the nut is held or fed in a horizontal direction transverse to its thread axis, the sleeve and nut may be moved relatively in a horizontal plane into a telescoping relation. In any event, following the feeding of the powder into the sleeve and the telescoping of the sleeve with the nut, suitable stop means or abutments 82 and 84 (FIGURE 11) are brought into position to hold the nut and sleeve against axial movement while the plunger 74 is advanced, as illustrated in FIGURES 11, 12 and 13. The powder is discharged through the slot 68 onto the nut thread surfaces in the area exposed by the slot, the wall thickness of the sleeve and the size of the metering notch determining the amount of the deposit, excess powder, if any, being discharged by the plunger from the other end of the sleeve. Thus, the sleeve and the plunger deposit a predetermined quantity of plastic powder, in a predetermined mound, on the nut thread as illustrated in FIGURES 12 and 13.

The nut is then conveyed to a supporting plate 86', FIGURE 14, and positioned in the magnetic field of a high frequency induction heating coil 88' and removed from the forward end of the sleeve 66.

The induction heating coil, in a predetermined short time, brings the nut body to a temperature sufficient to melt the plastic powder and is shut off.

Plastic material of a type suitable for this purpose will when heated to its melting temperature more or less readily flow longitudinally and circumferentially of the nut thread under the action of gravity to wet and form a most intimate contact with the thread defining surfaces of the nut and will flow into any depressions in those surfaces. The melted plastic is of relatively low viscosity, as compared with plastics generally, but on cooling hardens into a coherent unitary body or plastic patch extending over the crests of a predetermined number of thread convolutions, as illustrated in FIGURES 1 to 6, before the melted plastic has had a chance to completely level off longitudinally of the nut thread.

Other pastics may be used in place of Nylon 11 but it is desirable that such materials have a number of properties and characteristics comparable with or similar to Nylon 11, in addition to elastic memory. Thus, at its melting point the material should have a viscosity of the order of that of Nylon 11 and should preferably exhibit good wetting properties when in contact with metals. Other properties which need to be taken in consideration are relatively low moisture absorption, high resistance to abrasion, great resistance to common chemicals, high relative hardness, high strength, toughness and resiliency, and low coefficient of friction. Since for many uses, the plastic materials will be exposed to temperatures as high as 250 degrees Fahrenheit, it is preferable that for general purpose uses the plastic be mechanically and chemically resistant to prolonged exposure at temperatures above 250° F.

Other considerations which enter into the selection of a plastic to be employed in accordance with the teaching of this invention are concerned, to a suitable extent, with properties facilitating manufacture of the patch type fastener. In this connection, it is desirable that the plastic be available in fine powder form or reducible thereto; that it be capable of adhering directly to the material of the nut with a firm bond and require no more than simple and inexpensive preparation of the metal thread surfaces to obtain such firm bond. It is also desirable that the material have a melting point or flow point which is well below the temperature at which it begins to degrade or decompose so that complex or expensive heating controls may not be required.

By way of example and illustration, other linear polyamide resins such as Nylon 6, Nylon 6/6, Nylon 6/10 and Nylon 8 have properties as outlined above which are fairly comparable with those of Nylon 11. Certain of the vinyl resins, including particularly certain vinyl chloride-vinyl acetate copolymers, also possess the above described properties to an adequate degree and can be used where exposure to organic solvents would not likely be encountered. FEP fluorocarbon, a copolymer of tetrafluoroethylene and hexafluoro-propylene, possesses the above described properties comparable, and in some instances superior to Nylon 11 and may also be used for general purpose uses. Polypropylene resins possess many of the above described properties, in comparable degree to Nylon 11, and may be used where exposure to organic solvents at temperatures above 176° F. is not likely to be encountered.

Referring now to FIGURES 15 through 21, a reusable plastic patch, self-locking screw or bolt 86 constructed in accordance with the present invention may have a helical thread 88 of standard form and dimensions and a free-form plastic patch 90. Patch 90 is formed without application of work shaping or molding pressures and extends longitudinally of the bolt and circumferentially thereof between longitudinally oriented leading and trailing boundary edges 92 and 94 respectively and between leading and trailing ends 96 and 98 respectively.

In order to reduce the stripping and shearing components of the forces exerted by the thread of a mating nut, and to provide the desired initial locking torque, as well as satisfactory locking torques over a number of reuses, the thickness and configuration of the plastic patch 90 is predetermined by the controlled deposition of a fine plastic powder.

It will be apparent, from FIGURES 15 to 21, that the thickness and angular extent of the plastic patch is not constant over the entire thread area covered thereby but varies in accordance with a predetermined prescribed pattern. Thus, plastic patch 90 has a main body portion 100 (FIGURE 19) of limited angular extent and of uniform thickness, chosen for the primary purpose of obtaining the desired locking torque. The thickness of the plastic patch gradually diminishes circumferentially from the main body portion 100 to a longitudinal boundary edge 92 along a tapered leading boundary portion 102, as seen in FIGURE 19. The longitudinal boundary edge 92 may be characterized as the leading boundary edge of the plastic patch, as distinguished from the longitudinal boundary edge 94 which is a trailing boundary edge in terms of the direction of rotation of the bolt 86 relative to a complementary threaded element in which it is inserted. Thus, the tapered portion 102 of the plastic patch 90 will be the first part thereof to engage a complementary internal thread as the bolt 86 is engaged with its mating element. The gradual increase in the thickness of the plastic patch throughout the leading boundary portion 102 and in the thread tightening direction, serves to effect a gradual engagement of the plastic patch with the oncoming complementary thread and gradually builds up the deforming forces to a maximum at the main body portion 100.

Since the forces, or components thereof, which tend to peel the plastic patch 90 from the thread 88 are those extending in the direction of rotation of the screw when tightening the same, the gradual engagement of the oncoming internal thread assures a gradual deformation of the plastic patch and a gradual increase in the deforming forces applied to the patch so as to build up to a maximum as the thickness of the plastic patch increases, and the maximum forces are applied to a location remote from the edge of the patch and are ineffectual to effect a peeling of the patch.

As best seen in FIGURES 19 to 21, the plastic patch 90 diminishes in thickness, or is tapered, toward the trailing boundary edge 94 thus providing a tapered trailing boundary portion 104 to further increase the area of surface contact between the plastic patch 90 and the surfaces of the thread 88 without significantly increasing the size of the primary torque-determining main body portion 100 of the plastic patch.

The plastic patch 90 is, as shown, a unitary cohesive body with its inner, metal contacting surface 106 contiguous with the thread defining surfaces of the thread 88 from the root surface 108 to and over the crest surface 110 of the thread.

It is noted (FIGURE 16) that the longitudinal boundary edges 92 and 94 taper longitudinally from a central portion of greatest angular or circumferential extent to the leading and trailing ends 96 and 98 of lesser angular extent. This longitudinal tapering of the patch further enhances the gradual buildup of the plastic deforming forces, thereby precluding peeling of the patch from the thread. Thus, the deforming forces are spread over greater longitudinal and circumferential distances to increase the area of the unitary plastic patch over which such forces act and decrease the concentration of the peeling forces which tend to tear the plastic patch 90 from the screw thread 88.

It should be noted that the leading end 96 of the plastic patch 90 terminates at a point spaced from the leading end of the screw thread by a distance of at least one full-thread convolution to assure proper mating with the internal thread prior to the engagement of the latter with the plastic patch 90.

The advantages of a gradual engagement between the plastic patch 90 and the complementary internal thread of a mating element are further realized by decreasing the thickness or depth of the plastic patch from a maximum at the longitudinally central portion to a minimum at the ends 96 and 98, see FIGURES 18 through 21.

In order to provide laterally directed wedging forces, as illustrated in FIGURE 7, the plastic patch 90 is generally to be limited, circumferentially, to an angle sufficiently less than 180 degrees to provide the maximum wedging effect on elongation of the patch circumferentially of the screw thread. A typical example is shown in FIGURE 19 wherein the maximum angle between the boundary edges 92 and 94, as indicated by the radial lines A and B measures 150 degrees and the angle between radial lines A and C and between radial lines B and D, which define boundary portions 102 and 104, respectively, each measures 30°. It has been found preferable that the maximum angular extent of patch 90 be at least 120 degrees.

Plastic patch 90 may be readily formed in the configuration described by depositing the plastic material in the form of a fine powder which is subsequently melted and cooled to produce, by the action of gravity and as determined by the surface tension of the melted plastic, a continuous, integral, cohesive patch of plastic material adhered to the thread defining surfaces of the bolt. The configuration of the patch is controlled by controlling the distribution, or depositing, of the plastic powder over the bolt thread.

FIGURES 22 and 23 schematically illustrate a method and an apparatus for depositing fine plastic powder over a limited area of the bolt thread surface. As there shown, the bolt 86 is positioned in a ceramic cradle or support 112 having a suitable slot 114 to receive and to mask at least one-half of the periphery of the bolt 86. A metal mask or shell 116, which may be made of a metal foil, encases the ceramic cradle 112 and the bolt 86 and is provided with a preformed aperture 118. It should be noted that the metal shield or mask 116 is positioned in metal contact with the head or shank of the bolt 86 and is suitably grounded so that the powder sprayed by the electrostatic gun 120 directs the electrostatically charged fine powder granules through the preformed aperture 118 in the mask onto the bolt thread and electrostatically deposits them on the unmasked grounded thread surface. The time and period of spraying is controlled, or predetermined, to insure the desired depth of coating. After the plastic powder has been sprayed onto the bolt, the shield 116 is disconnected from the ground connection and the bolt inserted in a heating oven or other heating unit and brought to the desired melting temperature of the plastic employed. When the plastic is in melted condition, it flows somewhat around the thread surfaces so as to take the form of the patch described and shown.

It should be noted that prior to the depositing of the plastic powder, the screw is dipped in, or otherwise treated with, a weak acid solution to clean the thread surfaces and if necessary to slightly roughen the same. It may also be preheated to drive off any moisture upon the surfaces of the thread.

Because of the fact that the plastic material starts out in powder form, intimate contact of the plastic to substantially the entire surface desired to be covered is achieved before melting, and during melting, the melted plastic immediately and thoroughly wets the clean surfaces of the thread and thereby establishes a more intimate contact between the inner surface of the plastic patch and the metal surfaces with which the melted plastic is in contact.

The same plastic materials may be used in coating of screws or bolts as in coating of nuts, as previously described, although for ease of manufacture the selected plastic when melted should not in the case of a bolt be significantly less viscous than melted Nylon 11 powder in order that it may not flow too rapidly, and therefore to a too great angular extent around the bolt thread.

Nylon 11 powder of a particle size to pass through a two hundred per inch mesh, or finer, is preferred, for both the nut and the bolt.

It is to be understood that changes may be made in the details and design of construction of the self-locking threaded fasteners and the methods of making the same as described herein without departing from the true spirit and scope of the invention as set forth in the appended claims.

What I claim is:

1. A self-locking threaded fastener wherein the thread is of standard form and the self-locking characteristic is derived from a patch of thermoplastic material applied in powder form to a plurality of thread convolutions of the unmodified surfaces of the thread to a limited circumferential extent and fused by heat and solidified without work-shaping pressures while the fastener is in a horizontal position, the patch being of the shape of a free-form liquid pool of the thermoplastic material adhered to the unmodified surfaces of the thread and gradually merging at its boundary edge portions into such surfaces of the thread.

2. A self-locking threaded fastener wherein the self-locking characteristic is derived from a patch of thermoplastic material applied in powder form to a plurality of convolutions of the unmodified surfaces of the thread to a limited circumferential extent and fused by heat and solidified without work-shaping pressures, the patch being of the shape of a free-form liquid pool of the thermoplastic material adhered to the unmodified surfaces of the thread and gradually merging at its boundary edge portions into such surfaces of the thread.

3. A self-locking threaded fastener wherein the self-locking characteristic is provided by a patch of solid thermoplastic material bonded to a plurality of convolutions of the unmodified surfaces of the thread to a limited circumferential extent, said patch being formed of such thermoplastic material melted and fused and solidified without work-shaping pressures and the solid patch being of the shape of a free-form liquid pool of the thermoplastic material adhered to the unmodified surfaces of the thread and gradually merging at its boundary edge portions into such surfaces of the thread.

4. A self-locking threaded fastener as set forth in claim 3 wherein the plastic patch is of such limited longitudinal extent as to provide at least one uncoated full thread convolution between the patch and one end of the thread of the fastener.

5. A self-locking threaded fastener as set forth in claim 3 wherein the thermoplastic material is selected from a class consisting of polyamide resins, vinyl chloride-vinyl acetate copolymer resins, polypropylene resins and copolymers of tetrachloroethylene and hexapropylene.

6. A self-locking threaded fastener as set forth in claim 3 and wherein the thermoplastic material is Nylon 11.

7. A self-locking threaded fastener as set forth in claim 3 and wherein said fastener is an internally threaded member and the angular extent of the plastic patch is not more than about 120° as measured from the thread axis.

8. A self-locking threaded fastener as set forth in claim 3 wherein the fastener is an externally threaded member and the circumferential extent of the patch is not more than about 150° as measured from the thread axis.

9. A method of making a self-locking nut which comprises depositing a predetermined quantity of plastic in fine powder form in a preformed mound on a selected area on the thread of the nut, heating the nut and plastic material to the flow point temperature of the plastic while the nut is positioned with its thread axis extending horizontally to permit flow of the melted plastic over the thread surfaces to a limited circumferential extent outwardly from the powder mound and allowing the fastener and plastic to cool to provide a gravity-form of plastic patch of limited circumferential extent adhered to the thread-defining surfaces of the nut.

10. A method of making a self-locking externally threaded screw which comprises spraying a plastic in fine powder form through a mask having an aperture of predetermined form, to provide a coating of predetermined circumferential and longitudinal extent, heating the screw and powder to the melting temperature of the plastic to allow the melted plastic to flow outwardly from the edges of the coating, to provide a gravity-formed plastic patch of limited circumferential and longitudinal extent adhered to the threat-defining surfaces of the screw.

11. A method of making a self-locking threaded fastener which comprises depositing upon a selected area of the unmodified surfaces of a plurality of convolutions of the thread of the fastener a thermoplastic material in powder form and in a mound of less than 180° circumferential extent, heating the thermoplastic material to its melt temperature, positioning the fastener in a horizontal position while the plastic is in melted condition, and cooling the same to provide a unitary cohesive solid plastic patch extending circumferentially of the thread surface to a limited extent and being of the shape of a free-form pool of liquid thermoplastic material.

12. A method of making a self-locking threaded fastener wherein the self-locking characteristic is derived from a patch of thermoplastic material of limited circumferential extent adhered to the unmodified surface of the thread, which method comprises depositing upon a selected area of the thread of the fastener a quantity of the thermoplastic material in fine powder form to form on a plurality of convolutions of the thread surface a mound of less than 180° circumferential extent, heating the fastener and thermoplastic material to the flow point temperature of the thermoplastic material and thereafter cooling the thermoplastic material to a temperature below said flow point to provide a unitary cohesive patch of solid thermoplastic material bonded to the thread.

13. A self-locking screw threaded fastening device made according to the method of claim 12.

14. An internally threaded self-locking fastening device made according to the method described in claim 12.

15. An externally threaded self-locking fastening device made according to the method described in claim 12.

References Cited by the Examiner

UNITED STATES PATENTS

| | | | |
|---|---|---|---|
| 1,158,454 | 11/1915 | De Camp | 151—7 |
| 2,286,336 | 6/1942 | Brooke | 264—269 |
| 2,533,894 | 12/1950 | Podell | 151—7 |
| 2,741,288 | 4/1956 | Johnson | 151—7 |
| 3,061,455 | 10/1962 | Anthony. | |
| 3,093,177 | 6/1963 | Villo | 151—7 |
| 3,173,466 | 3/1965 | Starriett et al. | 151—7 |
| 3,176,744 | 4/1965 | Brightman | 151—7 |

FOREIGN PATENTS

| | | |
|---|---|---|
| 632,748 | 10/1963 | Belgium. |
| 1,357,437 | 2/1964 | France. |

CARL W. TOMLIN, *Primary Examiner.*

M. PARSONS, Jr., *Assistant Examiner.*